(12) United States Patent
Charugundla

(10) Patent No.: US 9,917,947 B2
(45) Date of Patent: *Mar. 13, 2018

(54) INTERNET PROTOCOL TEXT RELAY FOR HEARING IMPAIRED USERS

(71) Applicant: Kent S. Charugundla, New York, NY (US)

(72) Inventor: Kent S. Charugundla, New York, NY (US)

(73) Assignee: C21 Patents, LLC, New York, NY (US)

( * ) Notice: Subject to any disclaimer, the term of this patent is extended or adjusted under 35 U.S.C. 154(b) by 159 days.

This patent is subject to a terminal disclaimer.

(21) Appl. No.: 14/740,558

(22) Filed: Jun. 16, 2015

(65) Prior Publication Data
US 2015/0288815 A1    Oct. 8, 2015

Related U.S. Application Data

(63) Continuation-in-part of application No. 12/496,165, filed on Jul. 1, 2009, now Pat. No. 9,124,716.

(51) Int. Cl.
| | |
|---|---|
| *H04M 3/42* | (2006.01) |
| *G10L 15/26* | (2006.01) |
| *H04M 1/247* | (2006.01) |

(52) U.S. Cl.
CPC ......... *H04M 3/42391* (2013.01); *G10L 15/26* (2013.01); *H04M 1/2475* (2013.01)

(58) Field of Classification Search
CPC .... H04M 1/725; H04M 3/42; H04M 3/42391; H04M 3/493; H04M 7/00; H04M 11/00; G10L 15/26
See application file for complete search history.

*Primary Examiner* — Andrew Lai
*Assistant Examiner* — Leon Andrews
(74) *Attorney, Agent, or Firm* — Paul Sutton; Barry Magidoff

(57) ABSTRACT

An IP text relay is described herein, to facilitate communication through the use of VOIP or internet telephone system between people of hearing impaired and non hearing impaired. This service and device will enable users to communicate with users of hearing via assistance of an operator who will transcribe.

22 Claims, 2 Drawing Sheets

INTERNET PROTOCOL TEXT RELAY FOR HEARING IMPAIRED USERS

CROSS REFERENCE TO RELATED APPLICATIONS

This application is a continuation-in-part of U.S. patent application Ser. No. 12/496,165, filed on Jul. 1, 2000 now U.S. Pat. No. 9,124,716 B1 issued Sep. 1, 2015 (and entitled Internet Protocol Text Relay For Hearing Impaired Users), which is incorporated herein in its entirety by reference, and which claims the benefit of U.S. Provisional Application No. 61/133,950, filed on Jul. 3, 2008 (and entitled IP Text Relay For Hearing Impaired Users), which is incorporated herein in its entirety by reference.

BACKGROUND OF THE INVENTION

Field of the Invention

The present invention generally relates to the field of telecommunications. In particular, the invention relates to a system and method for assisting the hearing impaired by a communications assistant.

Description of the Related Art

There is a necessity for humans to communicate with one another. There have been many inventions to assist such communication, especially in the field of devices or services for the deaf. However, most of these devices have been created using BAUDOT protocol, used for modem to modem communication, which was communicating at 45.5 baud. Commonly known devices are TDD or Teletype TTY. Some of the modem devices are TDD consisting of keyboard and display with built in modem.

Due to the proliferation of the internet, the present invention will provide a mechanism for to people to communicate with each other regardless of geographic boundaries. The present invention may be used with any telephone currently available or will be invented in the future to assist the communications assistant or the operator. The present invention may replace many of those devices as it uses internet protocol which works over a global communications network. The present invention will further assist companies and service providers who are in the business of translating and transcribing.

The advantage of this invention described herein will allow the end user device to receive text or captioned text to be displayed. The words spoken by the called party will be transcribed by an operator or communications assistant for streaming to the device of an end user who is healing impaired. The device may be any of IP phone, Blackberry, WM—Windows Mobile, Symbian an operating system of NOKIA, Java, Flash, XML, etc., as is well known to those skilled in the art.

Accordingly, there is now provided with this invention an improved communications system for the hearing impaired effectively overcoming the aforementioned difficulties and longstanding problems inherent in the voice communication field.

SUMMARY OF THE INVENTION

According to one aspect of the invention, a system for communication is disclosed comprising a first telephone for transmitting and receiving voice and text by IP communication, a transceiving device for transmitting and receiving voice and text communication connected by ip to the first telephone, and a second telephone operatively connected to said transceiving device for transmitting voice communication thereto. The transceiving device provides the text of the voice communication from the second telephone to the first telephone.

Another aspect of the invention includes a method of communication comprising sending a first voice communication from a first telephone to a second telephone through a transceiving device and receiving a text message from the transceiving device. The text message is a text of a voice communication from the second telephone in response to the first voice communication.

Still another aspect of the invention includes a method of communication comprising receiving on a transceiving device a first voice communication from a first telephone connected by ip to a second telephone and providing text transcription of the voice communication from the second telephone to the first telephone by the transceiving device.

As will be appreciated by those persons skilled in the art, a major advantage provided by the present invention is that persons hard of hearing may communicate by means of a telephone to persons who can hear. Additional objects of the present invention will become apparent from the following description.

The method and apparatus of the present invention will be better understood by reference to the following detailed discussion of specific embodiments and the attached figures which illustrate and exemplify such embodiments.

DESCRIPTION OF THE DRAWINGS

A specific embodiment of the present invention will be described with reference to the following drawings, wherein.

DESCRIPTION OF THE PREFERRED EMBODIMENT

The following preferred embodiment as exemplified by the drawings is illustrative of the invention and is not intended to limit the invention as encompassed by the claims of this application. A system and method for providing communication for a hearing impaired person is disclosed herein using the following definitions and abbreviations:

ACD: Automatic Call Distribution, software or hardware based systems with ACD software generally used in call centers SQL: Structured Query Language, used for Database ANI: Automatic Number Identification or Caller ID DNIS: Dialed Number Identification Service. This allows a service provider or call center agent to know which number the caller dialed or wishes to dial.

CRM: Customer Relationship Manager. This is typically used by call centers and their agents to manage the call or treat the call in a window.

Stored Procedure: a function in SQL which updates/writes to the SQL Database. This functions as a small program.

IP Phone: Any Internal Protocol based phone, for example, a Cisco 7960 which is capable of receiving XML feed.

URL: Uniform Resource Locator. This is commonly known as a web address.

XML: Extended Mark-up Language, as is commonly used in websites.

Figure 1:
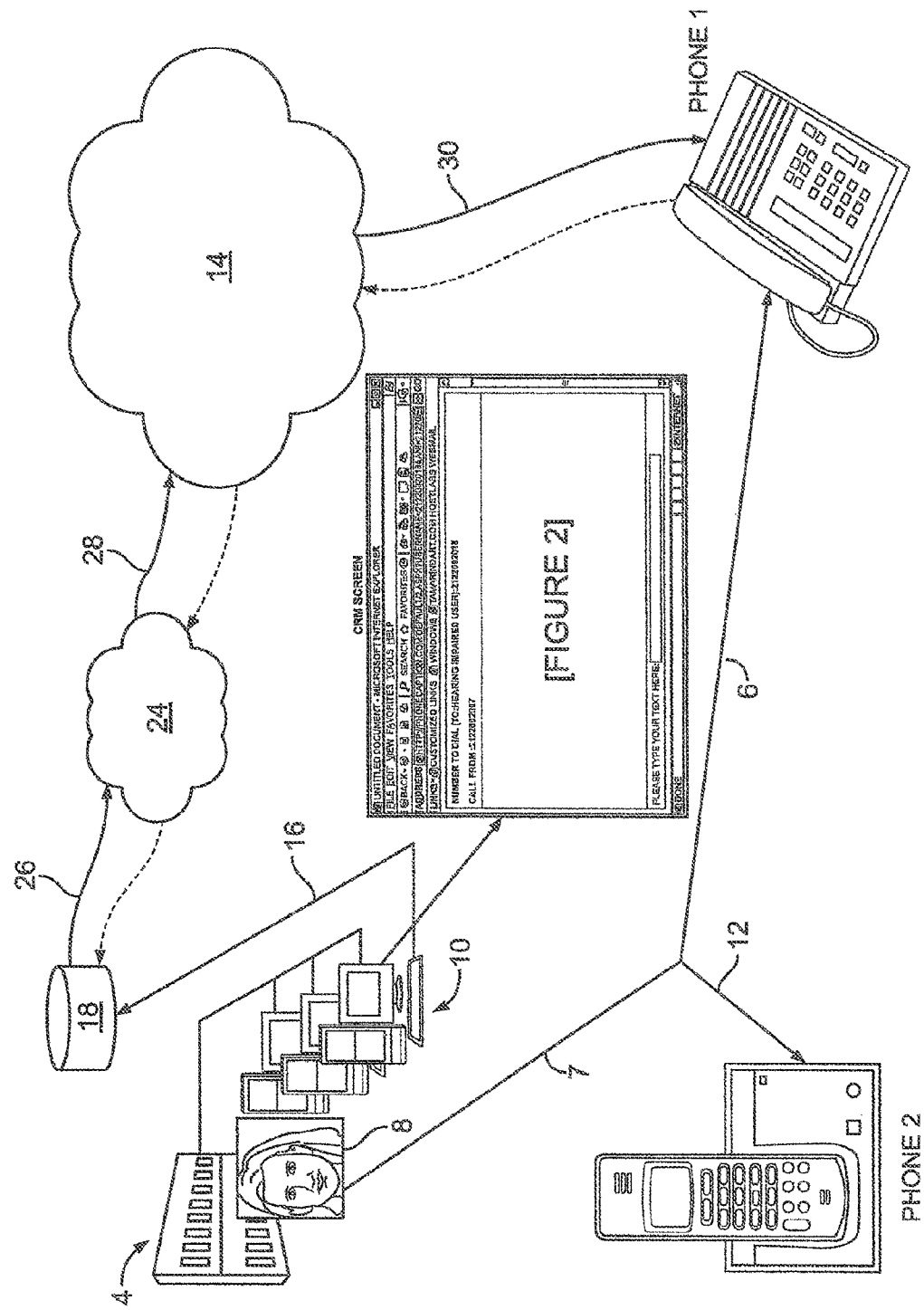
FIG. 1 is a schematic representation of the system of the present invention.

Service URL: a pre-determined route which allows an IP phone to fetch its XML/Data feed DB: Database The system, as illustrated generally in FIG. 1 shows a telecommunications system between a phone 1 and a phone 2. The user of the phone 1, as contemplated here, would be typically a hearing impaired person or one commonly referred to as hard of hearing. The user of phone 2 would typically be a person who can hear. Any one or any combination of one or more of the equipment shown in FIG. 1 can be implemented as the transceiving device of the present invention.

In order for a hearing impaired person to use the telecommunications system of the present invention, which would enable phone 1 to receive the text transcription of the voice communication of phone 2, the user of phone 1 must be a registered user. To register for the service, the hearing impaired customer must first visit a hosting website, such as PhoneCaption.com. To register for use, the hearing impaired person would typically enter personal profile data, for example, first and last name, address, primary phone number (the one on which he or she wants to receive text), and his or her e-mail address. Further, the hearing impaired person may select, during registration, specific features regarding the type of transcription service desired. One feature is the override feature, which allows the hearing impaired person to specify, with the use of system defined commands, specific instances (or time periods) during a telephone conversation where he or she does not desire the transcription of voice communications being received (by the phone of the hearing impaired person, e.g., phone 1) from the other phone (e.g., phone 2). Also, another embodiment of this override feature is the hearing impaired person opting not to have any transcription services at all during any telephone conversation; this feature will remain in effect indefinitely until the hearing impaired person edits his registration information. Registration information refers to information entered by the hearing impaired person during registration or during an update of registration. The hearing impaired person has the ability to select—during registration or during an update of registration—from at least two options of this feature in which no transcription services are provided by the ACD relay center 4 or any combination of the ACD relay center 4 and other equipment (e.g., computer 10, web server 24, database 18) of the system. The ACD relay center 4 or any combination of the relay center 4 connected to the other equipment of the system may generate the various commands (during registration or during updating of registration) to be used by the hearing impaired person to signal the ACD relay center 4 that no transcription services are to be provided for an indefinite period of time or for specific time periods during a telephone call between the hearing impaired person and another person who may or may not be hearing impaired. In the case where both parties to a telephone call are hearing impaired, both parties will have the ability described above to select from various versions of the override feature.

Upon entering the above information, the user is authenticated or registered and typically provided with an 800- or 888-number provided by the relay service, which is matched with their primary registered number where they will be receiving the phone calls. The user of phone 1 would give out this 800- or 888- or any other ten-digit number assigned by the relay service provider to their friends, family, or business associates where they will be receiving calls. Upon registration and authentication of such a user, the user information is in the database of the service provider so that he or she can make or receive phone calls with transcriptions.

When the phone 1 user wishes to make a call, he/she calls the pre-assigned 800-number for their account and when prompted, he/she enters the number they wish to call. Phone 2, however, does not have to be a registered user as he/she can hear and has no need for transcription or captioning. When phone 2 receives a phone call, that phone call must be originated from phone 1 via the 800- or ten-digit number assigned by the relay service provider to use captioning service.

Phone 1 may be an IP phone or any phone capable of displaying text from an internet connection, for example, IP Phone, BlackBerry, WM—Windows Mobile, Symbian an operating system of NOKIA, Java, Flash, XML, etc. Phone 1 may be any telephone from any carrier with the ability to fetch XML text by having the service URL programmed into the phone. Phone 1, having auto refresh, would get the newest text in XML format automatically.

The phone 1 is operatively connected to an ACD (automatic call distribution) relay center 4 by connections 6 and 7. Such connections 6 and 7 may be any type of connection regardless of connection media, for example, internet, wireless, 3G, GSM, TDMA, CDMA, or any packetized network. The user's phone 1 may further include any connected devices necessary to perform multi linked duplex communication and any interact connected device(s) capable of displaying internet content to perform communication.

An agent or a communications assistant 8 would typically use a headset connected to a computer 10. Of course, as is well known in the art, the agent may be wholly or partly replaced by voice recognition software capable of providing a text transcription of voice communication. The computer 10, running CRM and speech recognition software would be operatively connected to the ACD relay center 4 by any connection capable accepting calls from the ACD environment regardless of connection media, for example, wireless, 3g, gsm, tdma, cdma or any packetized network. The ACD relay center would be further connected by connection 12 to a party with whom the user wishes to communicate using phone 2. Connection 12 may be any internet connection regardless of connection media, for example, wireless, 3g, gsm, tdma, cdma or any packetized network. The ACD relay center, has the wherewithal to route the call and conference the call with an operator or communications assistant/agent.

The ACD relay center is connected to the internet 14 by connection 16 to a database 18. Connection 16 is a multi-linked, multi-tier ip capable of handling multiple calls. The operator 8 together with the computer 10 includes any devices necessary to perform multi-linked duplex communication. Updated text from the relay center is sent to the database 18.

The database is connected to the internet 14 via a web server 24 and connections 26 and 28. This server is typically a Service URL Server. Phone 1 may be connected to the internet by connection 30 whereby the service URL responds to phone 1 with updated text.

In use, the system of the present invention operates as a relay service and a method by a stream of text may be provided a hearing impaired person. For example, a hearing impaired person, using phone 1 may wish to call a person of hearing on phone 2. Although phone 1 dials the number of phone 2, the outbound call is directed to the ACD relay center. To the healing impaired person, it may appear as a regular connection. However, the reply to all of the voice communication from the hearing impaired person is a text transcription of the voice communication from the callee as transcribed by an agent or software at the ACD location.

In reverse, a person of hearing from phone 2 may call the ACD relay center to request the operator connection with a hearing impaired user of phone 1. Once the call has been established among the parties, the operator will continuously transcribe the conversation for transmission of text to the end user until the completion of the call.

Figure 2:
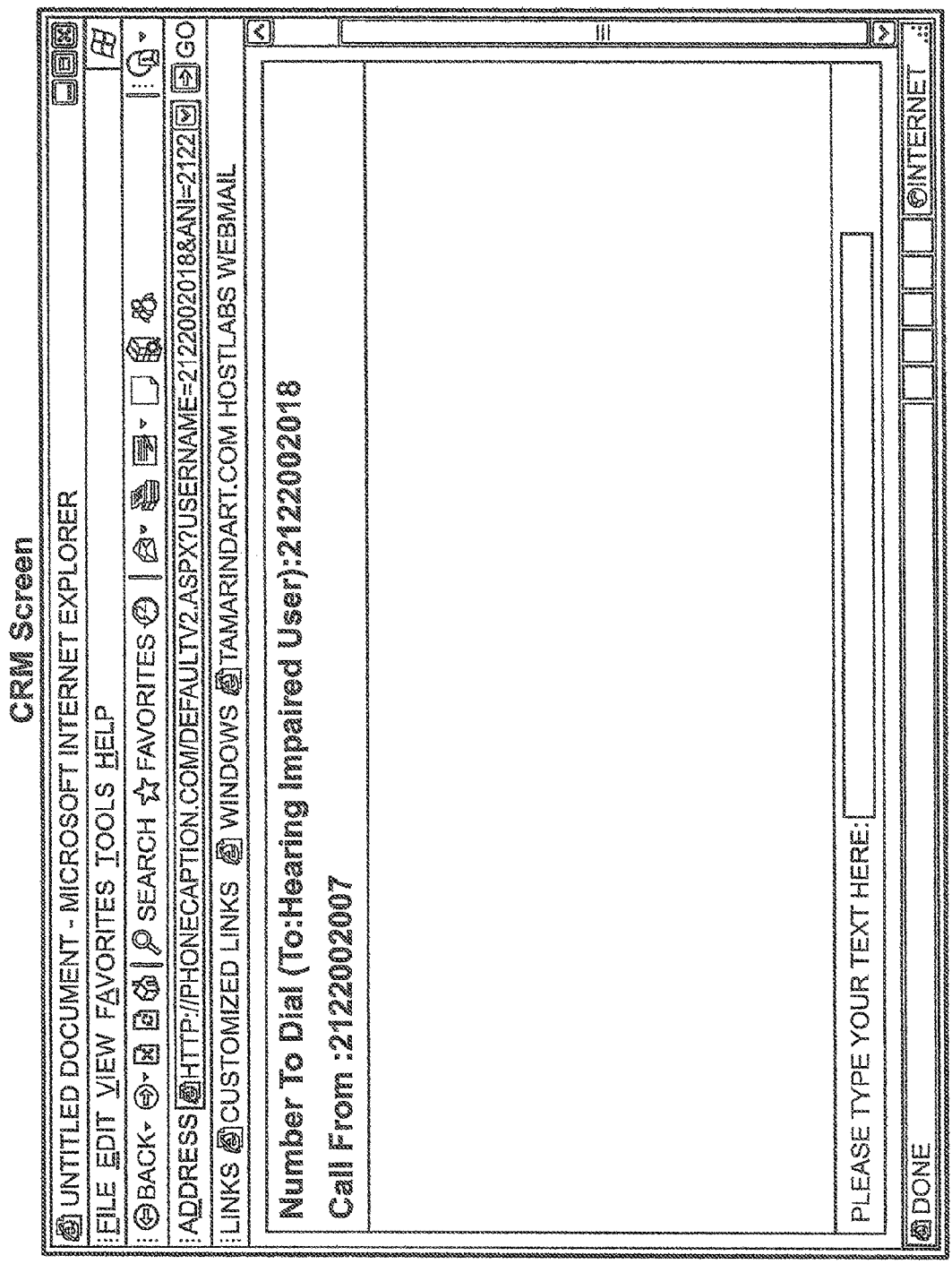
FIG. 2 is a typical screen shot of the agent receiving a call request from a person of hearing to a hearing impaired person.

When a person of hearing from phone 2 calls a hard of hearing person at phone 1, the call first arrives at the ACD. The ACD connects to the database SQL and determines the type of call to route the call to the agent along with call information. Such call information would be, for example, ANI/DNIS with the CRM Integration for that call. The agent then accepts the call with the information and makes a call to the person hard of hearing at phone 1 based on the information provided from the CRM, for example, the phone number. FIG. 2 illustrates the screen of the agent receiving such information. Phone 1 then answers the call. The agent conferences phone 1 and phone 2 together so that both parties can hear each other. The agent listens into the conference (three party call) and transcribes the voice of phone 2 into text SQL. The stored procedure updates the new text automatically to the database on the SQL Server. Typically, the agent will use both his own typing skills together with the assistance of speech recognition software to transcribe the text. Of course, as is known to those skilled in the art, this transcription may be performed either entirely or in part by software.

This process is possible through the agent's GRM integration with the data base (SQL residing on the SQL server). Phone 1 is preregistered with a relay service provider and serviced by any carrier, and programmed with a Service URL directed to Service URL Server.

At phone 1's request, the Service URL transmits the latest transcribed text in XML format. The Service URL Server fetches the data from the DB every time phone 1 makes a request. Text from the Service URL is seen on the screen of phone 1. As the URL auto refreshes, the XML is updated with the latest data/text. The new text is seen on the screen of phone 1.

The two scenarios discussed above where the hearing impaired person initiates the call (i.e., phone 1 calls phone 2) and where the hearing person initiates the call (phone 2 calls phone 1) provide the transcription of voice communications from the hearing person to the hearing impaired person. As discussed above, during registration, the hearing impaired person may select an override feature where the phone calls are routed through the ACD relay center 4, but the voice communications destined for the hearing impaired person are not necessarily transcribed. The present invention provides several options associated with this override feature.

The ACD relay center 4 checks the latest features for which the hearing impaired person has registered during the establishment of a telephone call involving the hearing impaired person. The telephone call is routed through the ACD relay center 4, but in a first option of the override feature, the voice communications destined for the hearing impaired telephone are not transcribed; this is so because the ACD relay center will have discovered that the hearing impaired person has chosen a first option where telephone call voice communications being received are not transcribed for all phone calls; i.e., transcription of voice is not activated. This option and feature selection can be shown, for example, on the CRM screen depicted in FIG. 2. For option 1, the ACD relay center 4, will resume the transcription of voice communications (i.e., activate voice transcription) being received by phone 1 (i.e., the phone of the hearing impaired person) when the hearing impaired person has updated his or her registration information to indicate a desire for voice transcription of incoming voice communications. As long as the registration information shows that an override feature was selected with this first option, the ACD relay center 4 will not perform any transcription services for the hard of hearing person.

A second option provides the hard of hearing person the ability to control when the override feature is to be used and when it is not to be used during any telephone call regardless of whether the hearing impaired person initiated the telephone call. During registration, or during the update of registration information, the hearing impaired person may select the option of being able to signal the system to stop or start the transcription of voice communications during a telephone conversation. During registration, when the hearing impaired person selects this option, web server 24 (or various combinations of system equipment of FIG. 1 including web server 4) generates a combination of key depressions keypad of a telephone) which would signal the ACD relay center to start or stop the transcription of voice communications destined for the phone of the hearing impaired person. For example, when the hearing impaired person presses (or dials) *1 on the keypad of phone 1 at any point during a telephone conversation, it is an indication to the ACD relay center 4 and/or the communication assistant 8 to transcribe voice communications or to resume (or activate) the transcription of voice communications destined for the phone of the hearing impaired person.

During the establishment of the telephone call between the parties by the ACD relay center, the various features and their corresponding options selected by the hearing impaired person (presumably during registration or update of registration) would be made available to the agent or communication assistant 8 alerting the communication assistant to be ready to start transcribing when the computer 10 or the ACD relay center 4 or both or any combination of equipment of the system of FIG. 1 detects the *1 signal. The various features selected by the hearing impaired person, may for example, be shown on the CRM screen depicted by FIG. 2. Continuing with this option, a *2 signal received from the hearing impaired phone would indicate that the hearing impaired person does not want to receive transcribed voice text and that the transcription service should be deactivated. If the hearing impaired want to reactivate the transcription services during the phone call, he or she will press *2 once again to signal the ACD relay center 4 to activate the transcribing of voice communications destined for the hearing impaired person. Thus, the hearing impaired person can switch between activation and deactivation of transcription services as many times as desired during a telephone call.

It should be noted that in this second option, the hearing impaired person is able to transmit a command at any time during a telephone conversation (i.e., during an established telephone call) to indicate a desire to receive or not to receive transcription service. As such, the ACD relay center (or the ACD relay center 4 or any combination of the relay center 4 and other equipment connected thereto) is alerted during the establishment of the telephone call to monitor the signals transmitted by the hearing impaired person when that person has selected the second option of the override feature.

For both options 1 and 2 above, the hearing impaired person further has the capability of causing the ACD relay center to amplify, in incremental amounts, voice communications destined for the phone of the hearing impaired person (i.e., phone 1 in FIG. 1). For example, during times—in either option 1 or option 2 of the override feature—in which the transcription service is activated or not activated, the ACD relay center 4 and equipment connected thereto as shown in FIG. 1, monitors transmissions from the hearing impaired phone (i.e., phone 1 in FIG. 1) for increase or decrease voice communications commands. These commands cause the ACD relay center 4 to amplify or attenuate the voice communications signals destined for the phone of the hearing impaired person; this third option can be invoked by the hearing impaired person depressing a set of specific keys on the keypad of the telephone of the hearing impaired person. Each depression is a command to amplify or attenuate the voice signals destined for the hearing impaired phone by a defined amount. For example, pressing an arrow up key (or right arrow key) signifies increase of voice signal amplification voice by 0.5 dB. Each successive command thus signifies an increase of the amplification of the communication signals (destined for the phone of the hearing impaired person) by 0.5 dB. It should be noted that the 0.5 dB amount is used for illustrative purpose only and does not in any way limit this embodiment of the present invention. The pressing of the arrow down key (or left arrow key) on the telephone keypad would conversely represent a command to attenuate of the voice communications by 0.5 dB. It will be readily understood that other key combinations can be defined for use by the hearing person to transmit commands to the ACD relay center 4 or any combination of the relay center 4 and the equipment connected thereto. The commands, for example, may be generated by web server 24 during registration and sent to the hearing impaired person via email or text. The particular combination of keys discussed hereinabove are for illustrative purposes only and the present invention is not limited to this particular implementation. It will be readily understood that other combination of any of the keys of a keypad of a telephone can be used to signal any of the commands discussed hereinabove.

Thus, the present invention discloses a process by which a device or service can facilitate communication between persons of hearing and those hard of hearing using any IP telecommunication device. The hard of hearing user will be able to receive text over any display device which is being transcribed by an operator or software from an internet connected computer. In this way, a hard of hearing person will be able to hear the voice of the party over the phone alongside seeing the same transcribed into text over the display of an IP device. The procedure automatically updates the text to hard of hearing users. The text is delivered to the hard of hearing user by means of XML.

Although the particular embodiments shown and described above will prove to be useful in many applications in the hearing impaired communication field and the general art of text communication to which the present invention pertains, further modifications of the present invention will occur to persons skilled in the art. All such modifications are deemed to be within the scope and spirit of the present invention as defined by the appended claims.

What is claimed is:

1. A system for communication, comprising:
a transceiving device for monitoring transmissions from a registered user telephone during an established telephone call to amplify or attenuate voice communications the transceiving device is transmitting to the registered user telephone based on commands received by the transceiving device from the registered user telephone, the transceiving device further monitors transmissions from the registered user telephone to detect commands of an override feature to selectively activate or deactivate transcription of voice communications destined for the registered user telephone into text signals,
wherein, during the established telephone call, the transceiving device transmits the text signals with the voice communications to the registered user telephone, and where the commands to amplify or attenuate voice communications and the commands to selectively transcribe voice communications into text were generated and sent by the transceiving device to a website during registration of the registered user telephone during which the transceiving device received user information, where the user information comprises a user primary telephone number and the transceiving device assigns a telephone number to the registered user telephone that is matched to the user primary telephone number, the transceiving device is also configured to automatically establish telephone calls originated by the registered user telephone and telephone calls originated by another telephone calling the registered user telephone and in establishing the telephone call the transceiving device is configured to automatically connect to the registered user telephone via an IP connection.

2. The system of claim 1 wherein, based on the override feature selected during registration, the transceiving device does not perform any transcription of voice communications being transmitted to the registered user telephone.

3. The system of claim 1 wherein during registration the transceiving device generates various combinations of telephone keypad depressions for use as commands to selectively activate or deactivate transcription of voice communications.

4. The system of claim 1 wherein during registration the transceiving device generates various combinations of telephone keypad depressions for use as commands to amplify or attenuate voice communications destined for the registered telephone.

5. The system of claim 4 wherein each key depression combination indicating amplification of voice communications signifies an amplification of 0.5 dB.

6. The system of claim 4 wherein an arrow up key used for an amplification command and an arrow down key is used for an attenuation command.

7. The system of claim 1 wherein the registered user telephone is an IP telephone.

8. The system of claim 1 wherein a voice recognition software is used to provide at least a portion of the text.

9. The system of claim 1 wherein the text is XML text.

10. The system of claim 1 wherein a voice recognition software is used to provide at least a portion of the text.

11. The system of claim 1 wherein the transceiving device provides streaming text transmission of voice communications from the other telephone in real time.

12. The system of claim 1 wherein the registered user telephone is an IP telephone.

13. The system of claim 1 wherein the transceiving device comprises and ACD relay center having a computer configured to execute voice recognition software and the computer is connected to a database via an interact connection where the database is connected to a Service URL web server and the internet connection is a multi-linked, multi-tier IP configured to handle multiple telephone calls.

14. A method of communication, comprising:
registering, by a transceiving device, a telephone user requesting registration for voice transcribing services where the transceiving device receives user information, through a website, the user information indicating selection by the telephone user of an override feature for activating or deactivating selectively voice communication transcription during an established telephone call and where the user information comprises a user primary telephone number that is matched to a telephone number assigned by the transceiving device to a registered user telephone;

connecting automatically, by the transceiving device, the registered user telephone to the transceiving device via an IP connection;

relaying, by the transceiving device, voice communications between the registered user telephone and another telephone in a telephone call established by the transceiving device; and when voice communication transcription is activated transcribing, by the transceiving device, during the established telephone call voice communications from the other telephone into text and the transceiving device transmitting such text along with the voice communications from the other telephone to the registered user telephone via the IP connection.

15. The method of claim 14, wherein the text is a real time transcription of the voice communications from the other telephone.

16. The method of claim 14 wherein the registered user telephone is an IP telephone.

17. The method of claim 14 wherein the transceiving step comprises the transceiving device generating, during registration, key depression combinations to be used as commands by the registered telephone indicating to the transceiving device the activation or deactivation of transcription of voice communications destined for the registered telephone during an established telephone call.

18. The method of claim 17 wherein a *1 key combination depression indicates activation of transcription of the voice communications.

19. The method of claim 17 wherein a *2 key combination depression indicates deactivation of transcription of the voice communications.

20. The method of claim 14 wherein the transceiving step comprises the transceiving device generating, during registration, key depression combinations to be used as commands by the registered telephone indicating to the transceiving device the amplification or attenuation of voice communications destined for the registered telephone during an established telephone call.

21. The method of claim 20 wherein a first defined key combination depression indicates amplification of the voice communications by 0.5 dB.

22. The method of claim 20 wherein a second defined key combination depression indicates attenuation of the voice communications by 0.5 dB.

* * * * *